US008254631B2

(12) United States Patent
Bongard

(10) Patent No.: US 8,254,631 B2
(45) Date of Patent: Aug. 28, 2012

(54) AUTOMATED SECURITY GATE ATTENDANT

(76) Inventor: Peter Bongard, Indio, CA (US)

( * ) Notice: Subject to any disclaimer, the term of this patent is extended or adjusted under 35 U.S.C. 154(b) by 947 days.

(21) Appl. No.: 12/277,017

(22) Filed: Nov. 24, 2008

(65) Prior Publication Data

US 2010/0128931 A1 May 27, 2010

(51) Int. Cl.
*G01K 9/00* (2006.01)

(52) U.S. Cl. .......................... 382/103; 348/143; 701/519

(58) Field of Classification Search .................. 382/100, 382/103, 104, 105, 181, 190, 195; 701/519, 701/521, 400; 348/135, 143, 169–172
See application file for complete search history.

(56) References Cited

U.S. PATENT DOCUMENTS

| | | | | |
|---|---|---|---|---|
| 6,513,119 | B1 * | 1/2003 | Wenzel | 726/2 |
| 6,945,303 | B2 * | 9/2005 | Weik, III | 160/188 |
| 7,015,943 | B2 * | 3/2006 | Chiang | 348/143 |
| 2001/0022615 | A1 * | 9/2001 | Fernandez et al. | 348/143 |
| 2004/0233983 | A1 * | 11/2004 | Crawford et al. | 375/240.01 |
| 2006/0107298 | A1 * | 5/2006 | Friar | 725/108 |
| 2006/0156361 | A1 * | 7/2006 | Wang et al. | 725/105 |
| 2007/0103541 | A1 * | 5/2007 | Carter | 348/14.06 |
| 2011/0058035 | A1 * | 3/2011 | DeBerry et al. | 348/143 |

* cited by examiner

*Primary Examiner* — Anand Bhatnagar
(74) *Attorney, Agent, or Firm* — Fulwider Patton LLP

(57) ABSTRACT

An automated security attendant for a mechanical gate includes an interface that queries a visitor as to the name and destination of the visitor, and then automatically proceeds with authentication of the visitor. The system includes cameras and recording equipment for capturing the visitor's face and license plates, and records this information along with a time and date stamp of the event. The visitor can be authenticated in accordance with a pre-stored list of names or license plates, or can be authenticated in real time through contact with authorized personnel. The system can further initiate two way conversation with between the visitor and the authorized personnel, and provide the authorized personnel with the image of the visitor's face and/or license plate. The system can also monitor the gate for damage and alert authorities where the security of the gate has been compromised.

30 Claims, 2 Drawing Sheets

AUTOMATED SECURITY GATE ATTENDANT

BACKGROUND

The present invention is directed to the field of security gate control for commercial and residential gated communities, and more particularly to an automated security gate attendant for obtaining and storing information related to visitors and users of the security gate.

Gated communities and various businesses use human gate attendants to regulate traffic through a security gate. The attendant or guard typically queries a visitor through various questions as to the nature of the visit, the name of the host, and may even include a communication such as a telephone call to the host to determine the authenticity of the visit. Human gate attendants offer certain features over automated controllers such as judging suspicious persons, protecting against follow-up or tailgating entrants who enter the gate once it is opened for someone else, and adding a human element to the operation. However, there are several downsides to using a human guard to attend to a security gate. First, it is usually necessary for the gate to be operated twenty-four hours a day. Finding attentive guards who can watch the gate for long hours is difficult and expensive. Guards can fall asleep, take coffee or bathroom breaks, have medical problems, as well as many other situations that cause the attendant to leave his or her post. Human guards can also be persuaded to let in entrants who may not be welcome, either through guile or deception, bribery, and the like. Human attendants are also not the best at recording and retaining information, such as license plates, names, and the like. Thus, there are many shortcomings associated with having a human attendant for a security gate.

Present automated systems also have shortcomings that render this option unsatisfactory. There are numerous products on the Gated Community Access Control market that provide for some type of access control such as gate "call boxes" or "telephone entry systems." These devices simply display the names and/or phone numbers of residents who live in the gated community and who may have control over actuating the gate. To successfully enter such a gated community, one would typically perform one or more of the following methods:

1. Use an access device such as a remote control, similar to a garage door remote. These remotes can be rolling code or dip switches. Rolling code remotes are secure in that they cannot be duplicated and their use can be controlled as to time of day and day of week. These remotes can also be tracked and deleted, whereas dip switch remotes cannot be tracked or deleted.

2. Use an access control device other than a remote control, such as an RFID or transponder, bar code, proximity cards, LPR (License Plate Recognition) to gain access. All of these devices except LPR are secure and cannot be duplicated.

3. Enter an access code using a key pad mounted on the call box. Multiple codes can be implemented with one or more restrictions based on the time of day or day of the week.

4. Use the call box to search for and call a resident who answers, and subsequently presses a key code on a touch tone phone pad that automatically opens the gate.

5. Tailgate behind another visitor as the gate opens and closes.

6. Push the gate open, using either manual force or using a vehicle.

7. Remove the gate arms or manually displace the gate arms to gain access.

Each of the methods above are prone to abuse, oftentimes necessitating a human guard. In particular, each of the options above allow for tailgaters to enter the premises, requiring a guard where security demands it. Automated systems that require an access code or telephone number be entered on a touchpad are of minimal value if the code or number is divulged to the wrong people. Automated systems typically have no means for taking information from the visitor which can be verified in the event of a breach in the security. If the security gate is breached by force, the breach may be undetected by an automated attendant. Other automated systems utilize proximity cards that are read by a reader to authenticate the visitor. Such systems allow information on the arrival and departure of the visitor, but such cards can be duplicated or manipulated, allowing unauthorized visitors to enter without detection. Thus, there is a need in the art for a system that recognizes the shortcomings of the above systems and seeks to overcome the shortcomings in an efficient, cost-effective manner.

SUMMARY OF THE INVENTION

The present invention is directed to a virtual security guard that includes a visual and audio feedback to a visitor for regulating a security gate. The automated attendant can take the shape of a human form, or more preferably can include a screen or monitor that displays a virtual attendant such as a caricature or video that visually depicts a human attendant. Using motion detectors or presence sensors, the automated attendant "awakens" when a visitor approaches the security gate and engages the visitor to begin the process of determining authenticity of the visitor. The automated attendant can include a voice simulator for simulating speech to a visitor for welcoming the visitor and for soliciting information such as destination, visitor's name, and host's name, or a welcome screen can display a welcome message and request for alternate language. The system includes an audio recorder for recording verbal responses from the visitor, and could include speech recognition software for interpreting the responses by the visitor. Where speech recognition is utilized, verifications can be achieved through verbal confirmation or by means of a touch screen or the like.

The recorder allows the system to record the visitor's name and the destination of the visitor using a microphone and storage device. As the verbal exchange is taking place between the automated attendant and the visitor, cameras are actuated to capture photographs the visitor's face and license plate for retention in the storage device, which also preferably records the time and date of the encounter. Once the information has been obtained by the automated attendant, the host or resident may be contacted to determine if the resident accepts the visitor. Alternatively, other methods of authorization can be employed such as proximity cards, rfid transponders, bar code readers, license plate recognition software, driver license readers, auto expiring access codes and RF transmitters. A camera also captures the security gate in the event of movement of the gate, including a gate strike, damage to the gate, and the like, as well as capturing video of any attempt to bypass the automated attendant and sneak onto the guarded premises. Where the gate's integrity has been compromised, the system can be programmed to alert the appropriate security personnel and provide information on the cause of any damage. Authorized persons can input and modify guest name lists, license plates, or guest codes to authenticate visitors entering the premises, even remotely via the internet or by calling into the system. All data, including the visitor's photograph, recorded name, license plate, and other collected data can be stored together as a single event.

In one preferred embodiment, the system can print a guest pass that includes various information such as name, entrance time, host, and date of pass, and even a photo of the visitor. If a car attempts to tailgate behind an authorized vehicle, the system can automatically record the make, color, and license of the tailgater and alert a security warning or call response personnel. If the host or authorized person does not respond to a telephone call, the system can send an e-mail or text to alert the host to the visitor according to predetermined options. Also, in a preferred embodiment the host can view the photograph of the visitor or the visitor's vehicle such as through a local network or via the Internet to verify the authenticity of the visit. These and other features are variations on the present invention.

DETAILED DESCRIPTION OF THE PREFERRED EMBODIMENTS

Figure 1:
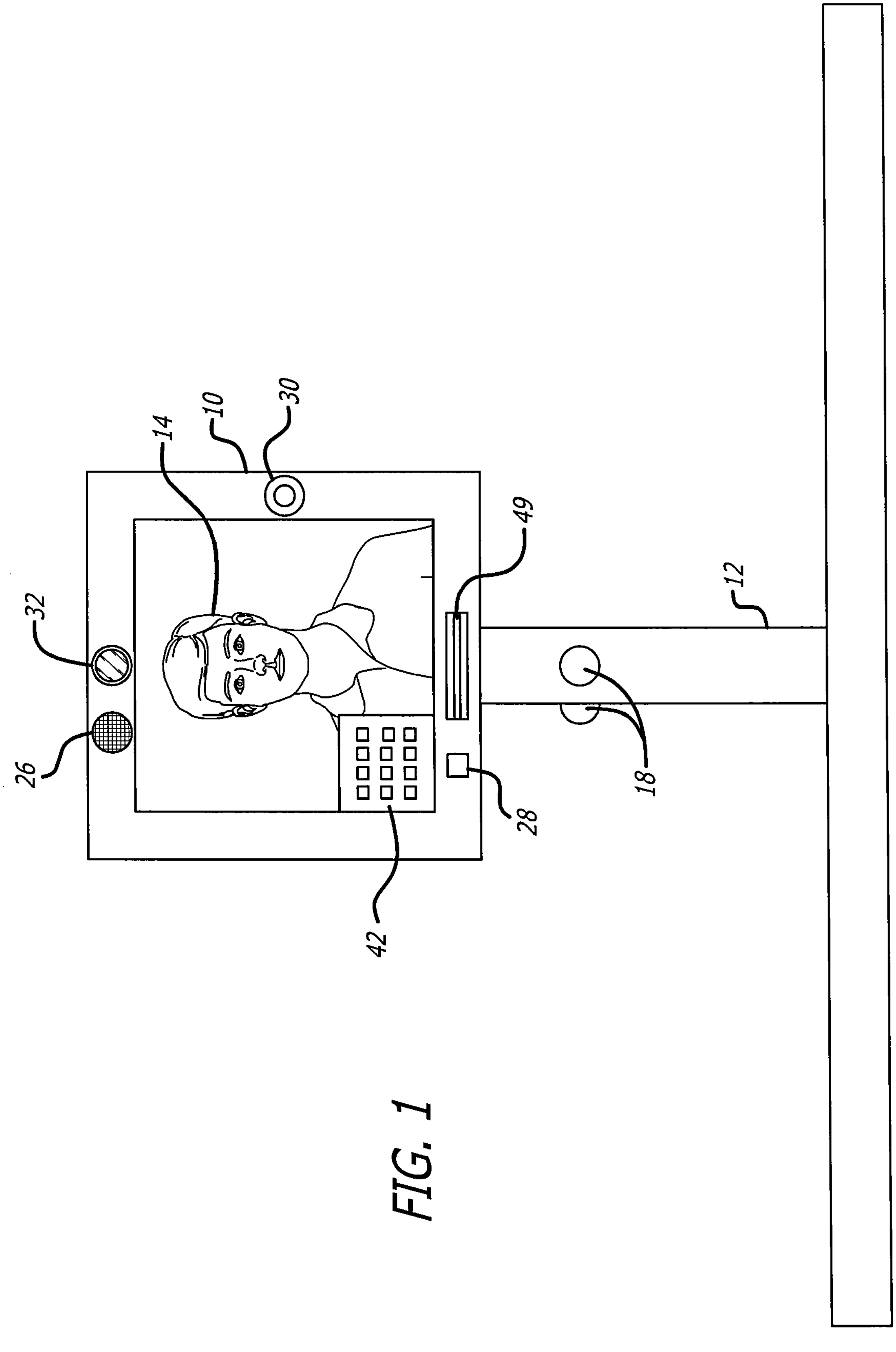
FIG. 1 is a front view of a first preferred embodiment of the present invention.
Figure 2:
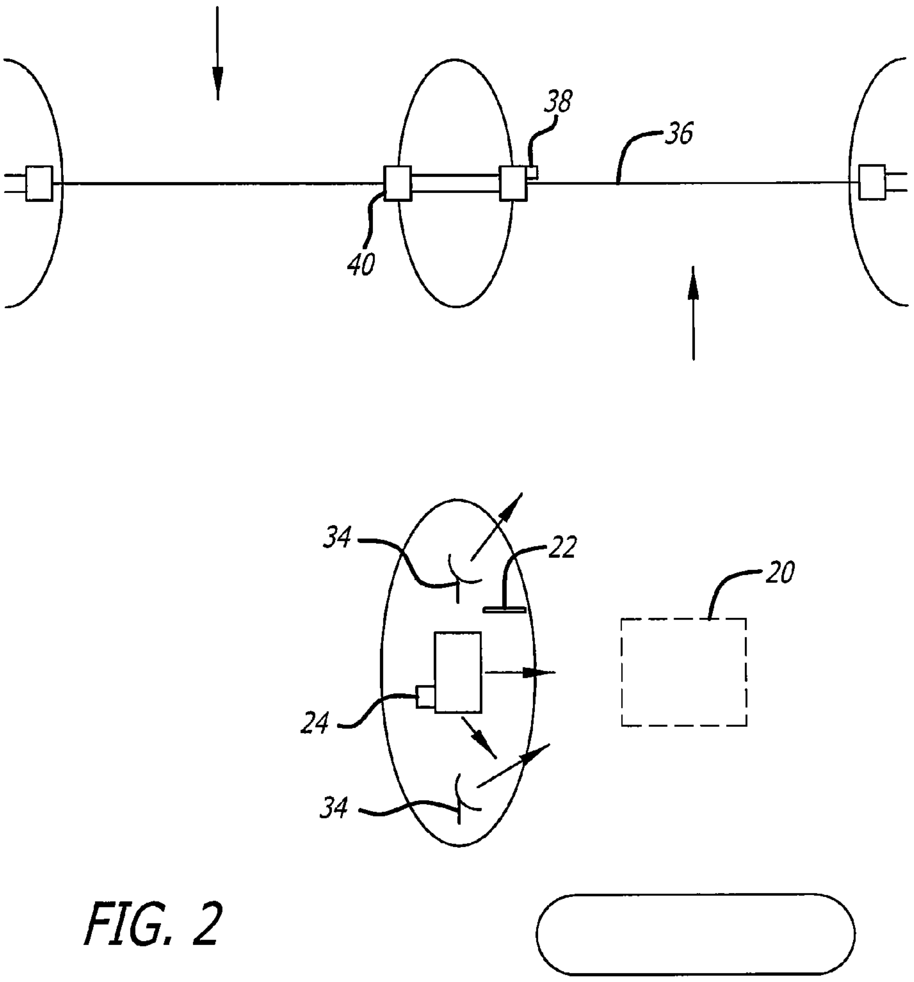
FIG. 2 is an aerial view of the first preferred embodiment.

The present invention utilizes various software and hardware to create a virtual security gate attendant that monitors, records, and regulates traffic through a mechanical security gate. Mechanical security gates restrict traffic into or out of a gated community, private business, secure facility, and parking structures are old in the art. These gates typically control vehicle traffic and the examples discussed herein are directed to a vehicle control system, although the present invention can be used for other kinds of traffic such as boats, pedestrian, and the like, and the invention is properly interpreted to include other types of traffic besides vehicle traffic. In connection with vehicle traffic, mechanical gates can be triggered by a proximity sensor or electronic signal sent over a cable/RF/other transmitting medium, and typically involve a motor that drives a gate or door opening device whether magnetic release, swing, slide or lift. Such gates are prominent in residential communities where traffic into and out of the community is regulated, although businesses, parking garages, and other commercial uses exist for security gates. The gates may have sensors that allow a vehicle to exit the premises without validation, but prevent entrance without either confirmation from a resident/authorized personnel or use of a validated access device FIG. 1 illustrates one embodiment of the present invention comprising a display monitor 10 mounted on a post 12. The monitor 10 can display a character 14, nicknamed "OTTO" (for example), that audibly and visually directs a visitor's attention to the monitor. The height of the post 12 is sufficient to place the monitor 10 at about window level for a driver in a typical automobile, and the post is mounted in the ground adjacent the security gate 36 in a firm and permanent manner. A motion sensor 18 can be mounted on either the post 12, the monitor 10, or an adjacent area for detecting the approach of a visitor such as an automobile. Alternatively, a weight sensor 20 can be positioned adjacent the structure and a stop sign 22 mounted just ahead of the structure that instructs a visitor to stop at the automated attendant. The motion sensor 18 and/or weight sensor 20 are designed to detect the presence of a vehicle and deliver a signal either wirelessly or along a cable (not shown) that connects the sensor to a microprocessor 24 for controlling the operation of the invention. The signal from the motion sensor 18 or weight sensor 20 alerts the microprocessor 24 of the presence of a vehicle, and causes the microprocessor 24 to awaken from a sleep mode and initiate a sequence of steps according to an embedded software program for validating the authenticity of the visitor.

The microprocessor 24 receives the signal from the vehicle detector and initiates a program that awakens the automated attendant. The attendant can be animated, in which case an animated sequence is initiated by the microprocessor 24 by recalling data stored on a memory for display on the monitor 10. Alternatively, the attendant 14 can be a video of a person, in which case the microprocessor 24 recalls video information from the memory and displays the video information on the monitor 10. Or, the attendant may be formed in the shape of a person and the microprocessor 24 recalls audio information to be relayed to the motorist through a speaker on the console or monitor 10. In each case, the attendant 14 appears to be active to the motorist and quickly captures the motorist's attention.

Once the automated attendant is awakened by the signal from the sensor 18 or sensor 20, the initial step can involve turning on the monitor from a sleep mode that helps to protect the monitor and save energy. A command is sent by the microprocessor 24 to illuminate the display 10, revealing "OTTO" 14 the automated attendant. Of course, the character 14 can take many forms and go by many names, and the use of the term "OTTO" herein is merely for convenience and plays no part of the invention. The display can also include a light sensor 28 that measures the ambient light, and adjusts the brightness of the display accordingly. For example, the display 10 need not have the same brightness level at night as during a sunny day. The light sensor 28 sends a signal to the microprocessor that conveys the ambient light, and the microprocessor interprets the signal and then controls the monitor 10 to increase or decrease the brightness of the display as necessary to make the display 10 easy to read.

The system may include a start button on the monitor 10 within reach of a motorist to initiate the sequence or the sequence can begin automatically once the sensor 18 or sensor 20 detects the presence of a vehicle. After the start button is pressed (or after a short pause if no start button is present), the microprocessor 24 initiates contact with the visitor by playing or displaying a welcoming message to the visitor. The welcome message can take the form of a textual message displayed on the monitor 10, by playback of a pre-recorded message through a speaker 26, or both. The character 14 may be animated to simulate actual verbal communication to coincide with the pre-recorded message playback, where the character 14 appears to be talking to the visitor. An exemplary audio message that is directed to the visitor as the visitor arrives at OTTO could state:

> "Welcome to the Brentwood Community, my name is OTTO your security access assistant. Would you please state your name?"

The message can also be displayed in text on the monitor 10 to help communicate with visitors where conditions make hearing the audio message difficult, such as wind, rain, traffic noise, or physical limitations of the visitor. In areas where multiple languages are prevalent, an alternate language button can be located near the display to change the message to the alternate language, such as Spanish, German, etc.

After the welcome message is communicated to the visitor, the microprocessor 24 begins recording the visitor's response via a microphone 30, preferably in digital format. The microprocessor 24 also uses a clock to record the date and time of the visitor's arrival, and stores the date and time data in an electronic file created for each occurrence of a visitor. A camera 32 captures a photograph of the visitor, preferably in digital format, while a second camera 34 photographs the license plate of the vehicle as it idles during the exchange. The photographs of the visitor's face, license plate, recorded name, time stamp and date stamp are all stored in a single electronic file for security purposes. The data can also be used for measuring the frequency and time of traffic through the gate for logistical or other purposes.

Either camera 32, camera 34 or another camera is positioned or rotated to view the gate 36 itself, and the gate may be equipped with either a motion detector or other sensor 38 for detecting motion of the gate 36. A photograph or video can be taken via the camera 34 each time the gate 36 is opened or otherwise moved to capture any tailgaters, damage to the gate 36, or entrance of unauthorized vehicles. For example, if the gate 36 were to be rammed by a driver, the motion sensor 38 would detect that the gate 36 was moved and send a signal to the microprocessor 24. If the microprocessor determines that there has been no valid authorization preceding the movement of the gate 36, the microprocessor 24 can send a signal to camera 34 (or other suitably place camera) to initiate video capture of the gate 36. The captured video could be stored along with a date and time stamp in a data storage device associated with the microprocessor 24, and the data could be used in the future to identify and/or prosecute a perpetrator. Moreover, the microprocessor 24 can send the video to offsite security personnel via a closed network or public network such as the internet, e-mail, etc., whereupon the security personnel could respond to the situation if the gate were compromised, damaged or the security was otherwise breached, such as by a tailgater. The security personnel could also alert repair personnel or the local authorities as necessary to address the situation.

As the visitor verbally responds to the welcome message requesting the visitor's name, the microphone 30 records the visitor's response. After recording the visitor's name, the microprocessor may then cause the speaker to playback a recorded command or request for information, such as "What is the nature of your visit to Brentwood Community?" or "Who are you here to see?" In a first embodiment the microprocessor 24 includes voice recognition software to interpret verbal responses and perform a verification based on the response. For example, if the visitor replies: "I want to visit Mary Jones," the voice recognition software processes the verbal response and then confirms the request with the visitor using an audio speech synthesizer or other speech generator, causing the speaker to play the response: "You want to visit Mary Jones, 312 Elm Street?—state 'Yes' or 'No'". The visitor can then confirm the request by stating "yes" or "no." If the answer is "No", the process is repeated. If a second attempt results in a second "no," the system may switch to a textual exchange using a keypad 42 or other keyboard that allows the visitor to enter the name of the resident or authorized personnel. Alternatively, the visitor can enter a digital code, phone number, or other designated response via a touch pad or keyboard to communicate the requested information to the system.

Once the visitor has entered the information on the resident or other authorized personnel, the microprocessor attempts to authenticate the visitor by obtaining authorization. This may involve various methods, including one or more of the following:

1. Checking a stored pre-determined list associated with the resident of the names of welcome visitors, and authenticating the visitor if the visitor's name or license plate appears on the list.

2. Initiating a program that telephones the residence of Mary Jones, and plays the recorded name of the visitor along with instructions for allowing the visitor to enter such as pressing a key on the telephone key pad or saying a word such as "OK."

3. Allowing the visitor to enter a code on the screen that authenticates the visit, where the code is known only by authorized visitors.

4. Allowing the visitor to insert a proximity card or Drivers License that includes information about the visitor and, if the information is valid, the visit is authenticated.

5. If the resident fails to answer the telephone and the visitor is not on an approved list, the microprocessor can send an e-mail, SMS text message, or other communication to the resident and attach the data file as an attachment. Here, the resident can view the license plate or photograph of the visitor's face and approve or deny entrance by calling a phone number included in the text message, or texting a response to a designated number. The microprocessor can receive the resident's response and authenticate the visitor depending on the response of the resident.

If the visitor's request for admission is authenticated, the microprocessor sends a signal to the security gate motor 40 to actuate and move the security gate away from the path of the visitor's vehicle, allowing the visitor to enter the premises. The motion detector 38 sends a signal to the microprocessor to capture video or static images via the camera 34 or other suitable camera to ensure that any tailgaters or other unauthorized entrants are captured on video. The video is stored for later retrieval in the event of an incident or report of unauthorized trespassers to the property.

The results of each of the attempts to enter the premises can be made publicly or selectively available to interested personnel, including information such as license plates, names, driver's faces, and whether authorization was granted or denied. The community can then be aware of individuals or license plates that have been repeatedly denied permission to enter in case such individual or vehicle is spotted on the premises. The information can be uploaded to a web site that is accessible by residents, authorized personnel, or the public at large.

In one preferred embodiment, the automated attendant can provide for telephonic communication between a visitor and a resident. Here, once telephone contact has been achieved with the resident, the system uses the microphone 30 and the speaker 26 to facilitate a two-way conversation with the visitor and the resident. The visitor, if not immediately known to the resident, can explain the purpose of the visit. The resident can also access the camera feed via the internet or e-mail for visual confirmation of the visitor. Once confirmation is achieved, the resident can enter a code, such as "9", to open the gate and allow the visitor to enter. The system can also incorporate other access control devices including a reader 49 of proximity card readers, rfid transponders, bar codes, or driver's licenses, and license plate recognition software, automatically expiring access codes and RF transmitters.

The system can also be equipped with a printer 44 to print out to authorized visitors a guest pass that can be placed on the dashboard of the vehicle designating authorization. The guest pass can have the date and time of the vehicle's entrance onto the premises, and an expiration date for the pass.

Figure 3:
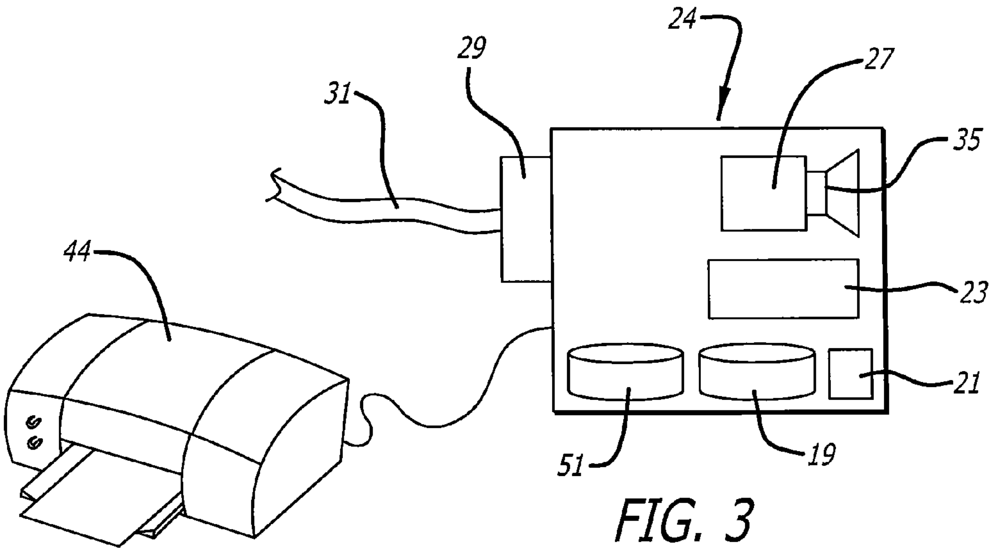
FIG. 3 is a schematic of the microprocessor and related modules for carrying out the various objects of the invention.

FIG. 3 is a schematic of some of the components and modules used by the microprocessor 24 to carry out the various objects of the present invention. It is to be understood that the arrangement depicted is only for schematic purposes and represents only an example of the many arrangements that can be selected to carry out the invention. Microprocessor 24 may include a voice recognition software module 27 that receives audio data from the microphone 30 and translates the audio data into a computer usable form. Voice simulator module 35 can be used to read data from storage or from the user input such as from the voice recognition software module 27 and play a voice message to the vehicle's driver, such as confirming an intended destination or request confirmation of a name or vehicle identification. The microprocessor also has a clock 21 associated therewith for creating a time and date stamp for each incident. The microprocessor reads the time and date stamp from the clock 21 and associates a recorded voice message, photograph of the vehicle's license plate and/or driver's face, and other possible information using a program for collecting the data in a file using module 23. A data transfer system 29 coupled to the microprocessor can export the file created by module 23 to a remote location, such as a resident, off-site security station, or other designated destination. The data transfer system can pass information through cable 31 such as a telephone cable, or can transfer the information wirelessly. The microprocessor also includes various data storage locations, such as a first data storage 19 for storing data associated with a welcome message to be delivered by the automated attendant 14. The data can be audio, video, animation, textual, or a combination thereof. Another data storage 51 can be used to collect captured photograph, audio, video, or textual responses exchanged by the vehicle's driver during the authorization process. Data storage 51 can also be used to store video of the gate 36 in case the gate is damaged or rammed by an unauthorized driver, whereupon the stored data can be retrieved or transmitted to an offsite location via the data transfer system 29. Also, the microprocessor can preferably be coupled to a printer 44 that can print out a permit, parking pass, authorization code, or other validation that may be required by the protocol of the facility.

The benefits of the automated system are multi-fold. The system does not suffer the drawbacks of human attendants (sickness, late for work, oversleeping, napping on the job, taking breaks, etc.). The system implements the strict guidelines for security protocol each and every time and cannot be persuaded or bribed. Moreover, a record is created and maintained for each entry and, if desired, each exit of the premises through the security gate detailing the driver's face, name, license plate, time of entry, and the like. Further, there are many options available for controlling guests, such as access cards, license plate recognition, pre-stored lists, internet or e-mail control, and telephone access.

I claim:

1. A system for authorizing a vehicle to enter a restricted area comprising:
- an automated attendant visually depicting a human attendant;
- a vehicle sensor for sensing a vehicle's presence;
- a microprocessor coupled to said vehicle sensor;
- a data storage for storing an audio message;
- a speaker for delivering the stored audio message to a vehicle upon the microprocessor sensing the vehicle's presence;
- a voice recorder for recording an audio response to said audio message;
- a camera for recording an image associated with the vehicle;
- a clock cooperating with said microprocessor to determine a time associated with the detection of the vehicle;
- means for collecting the image, audio response, and time in a single data file;
- a data transfer system for transferring the single data file to a remote authorizing person and receiving instructions from the remote authorizing person to allow or disallow passage of the vehicle; and
- a movable gate actuated by said instructions to allow passage of the vehicle if said remote authorizing person allows passage of the vehicle.

2. The system of claim 1 further including a voice recognition software cooperating with said microprocessor for interpreting the audio response, the microprocessor including audio playback for playing various pre-recorded stored messages in response to the interpreted audio response.

3. The system of claim 1 wherein the vehicle sensor is a motion detector.

4. The system of claim 1 wherein the vehicle sensor is a weight sensor.

5. The system of claim 1 further comprising a voice simulator for simulating a voice associated with the automated attendant, where the simulated voice is responsive to the audio response.

6. The system of claim 1 where a camera is positioned to capture a vehicle driver's face.

7. The system of claim 1 where a camera is positioned to capture a vehicle's license plate.

8. The system of claim 1 further comprising a magnetic card reader.

9. The system of claim 1 further comprising an ambient light sensor for adjusting a brightness level of the automated attendant.

10. The system of claim 1 including a screen for displaying a textual message to a vehicle's driver in response to vehicle sensor sensing of the vehicle's presence.

11. The system of claim 10 further comprising a keypad for entering textual information.

12. The system of claim 10 further comprising means for changing a language of the textual message.

13. The system of claim 1 further comprising a video capturing device for capturing video of the movable gate.

14. The system of claim 13 further comprising video transmitting means for sending said video of the movable gate to a remote location.

15. The system of claim 1 further comprising a driver's license reader.

16. A method for authentication of a vehicle for passage past a security gate comprising:
- sensing the presence of the vehicle using a sensor;
- engaging a driver of the vehicle using an automated attendant having a visual appearance of a human attendant;
- querying the driver with a message to elicit a destination and name of the driver;
- recording a response of the driver to the query;
- photographing at least one image of the driver's face and the vehicle's license;
- forwarding the recorded response and image to an authorizing personnel; and
- opening said gate upon authorization of the authorizing personnel.

17. The method of claim 16 wherein the photographing step includes the driver's face and the vehicle's license.

18. The method of claim 16 wherein the automated attendant is displayed on a monitor.

19. The method of claim 18 wherein the automated attendant is animated.

20. The method of claim 16 wherein the automated attendant is a video recording of a human.

21. The method of claim 16 wherein the sensing step uses a motion detector.

22. The method of claim 16 wherein the sensing step uses a weight sensor.

23. The method of claim 16 wherein the querying step is textual.

24. The method of claim 16 wherein the querying step uses a pre-recorded message played through a speaker.

25. The method of claim 16 further comprising using a speech interpreting software to interpret the recorded response and play a second message in response to said interpretation.

26. The method of claim 16 wherein the forwarding step is carried via a telephone connection.

27. The method of claim 16 further comprising capturing video information of the gate and sending the information remotely to security personnel if the gate is physically compromised.

28. The method of claim 16 wherein the forwarding step is carried by a text message.

29. The method of claim 16 further comprising reading the driver's driver license with a driver license reader.

30. The method of claim 16 further comprising providing a keypad for allowing a response to be entered by the driver in response to a query.

* * * * *